May 11, 1943.                O. P. CROUSE                  2,319,041
                             CONTROL DEVICE
                          Filed June 12, 1941           2 Sheets-Sheet 1
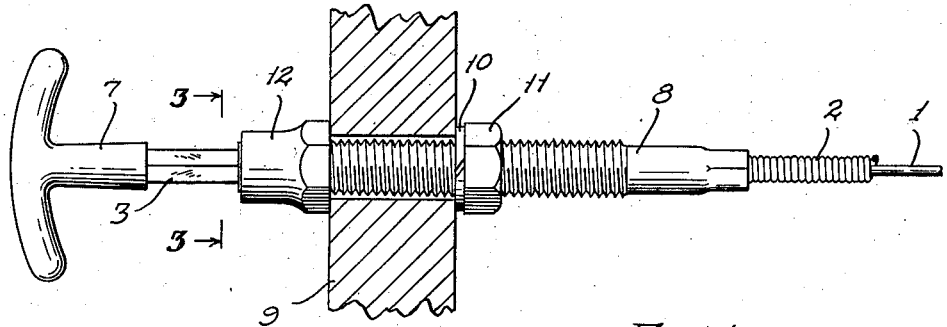
Fig. 1
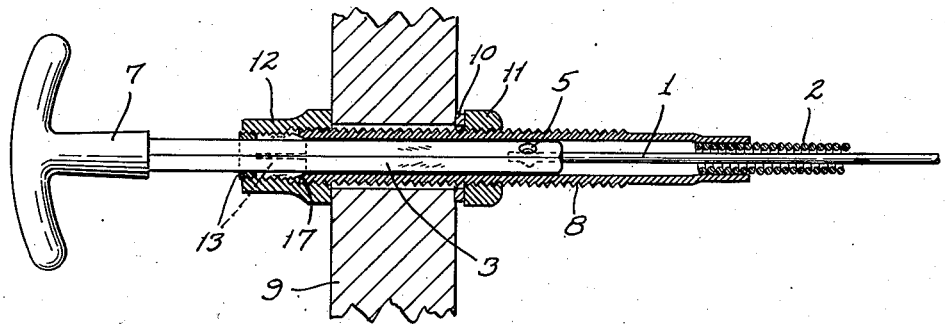
Fig. 2
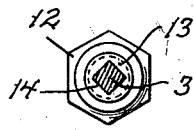   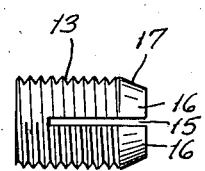   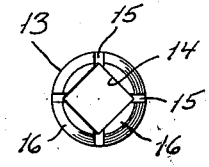
Fig. 3           Fig. 4           Fig. 5
                                        INVENTOR.
                              BY   Oliver P. Crouse
                                   Frank T. Singh
                                        His ATTORNEY May 11, 1943.  O. P. CROUSE  2,319,041
CONTROL DEVICE
Filed June 12, 1941   2 Sheets-Sheet 2

Patented May 11, 1943

2,319,041

UNITED STATES PATENT OFFICE 2,319,041

CONTROL DEVICE

Oliver P. Crouse, Mansfield, Ohio

Application June 12, 1941, Serial No. 397,753

1 Claim. (Cl. 74—502)

My invention relates to control devices of the type referred to generally as "Bowden controllers" which are utilized where it is desired to communicate motion from a control to a more remotely disposed control point, and relates further to improved means for retaining such control and controlled devices in an adjusted position, these devices being largely adapted for use on motor vehicles, aeroplanes, boats, stationary engines, industrial machinery and any remote operating unit, and the like.

Control devices of this general type, when adapted for use on motor vehicles as shown in my Letters Patent No. 2,234,623 are commonly mounted on the instrument board or dash and are operated by means of a handle accessible to the operator of the vehicle or plane.

It is an object of my invention to provide an improved Bowden controller which may be longitudinally operated to adjust a control remotely disposed therefrom, said control devices and said controlled devices being adapted to be locked in any such adjusted position.

Another object of my invention is to so form the Bowden control device as to enable the control wire, which is connected to the remotely disposed device to be controlled, to be swivably associated with said control device.

Another object of my invention is to provide an improved control device which can be positively locked in any adjusted position.

Another object of my invention is to provide a control device of the type referred to which is capable of being inexpensively manufactured, being made of comparatively few parts, and which will be efficient in use, and susceptible of greater ease of manipulation than prior Bowden control devices with which I am familiar.

Other objects of my invention and the invention itself will become more apparent by reference to the following description and drawings, said drawings forming a part of this specification, in which:

Fig. 1 is a side elevational view of the control device of my invention;

Fig. 2 is a longitudinal central view of the device of Fig. 1;

Fig. 3 is a transverse sectional view taken on the line 3—3 of Fig. 1;

Fig. 4 is a side elevational view of the collet of Figs. 1 and 2;

Fig. 5 is an end elevational view of the collet of Fig. 4;

Figures 8, 9:
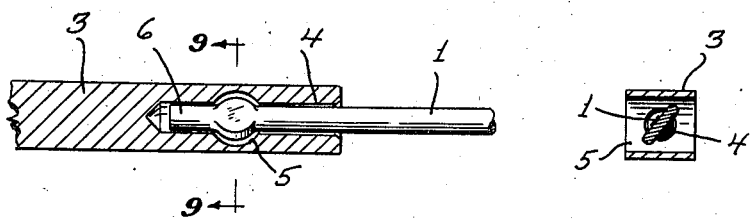
Fig. 8 is a longitudinal sectional view of a portion of the control device showing the connection with the control wire.
Fig. 9 is a transverse sectional view taken on the line 9—9 of Fig. 8.

Referring now to the drawings in all of which like parts are designated by like reference characters, at 1, I show a control wire which is encircled by a supporting sheath or Bowden tube 2, and which, at its outer end is extended beyond the sheath 2 and is connected in any suitable manner to the device which is to be controlled and which is not shown, the inner end of said wire being pivotally mounted in a preferably square rod 3. The control wire, which is projected within an aperture 4 in the rod 3, is disposed longitudinally of the rod 3, said aperture being enlarged at 5 wherewith a portion of the wire 1, which is flattened adjacent the inner end of said wire, is adapted to rotatably move within the enlarged opening 5, the terminus 6 of the wire being seated within the inner end of said aperture 4, as best illustrated in Figs. 8 and 9 herein.

Figure 6:
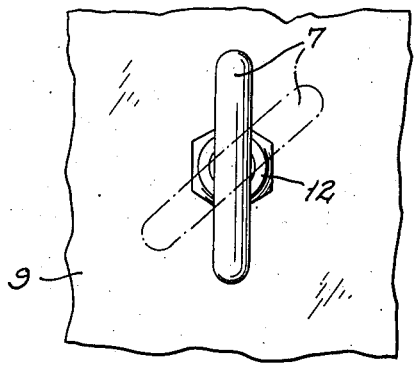
Fig. 6 is an end elevational view of the control device as it appears from the instrument panel.
Figure 7:
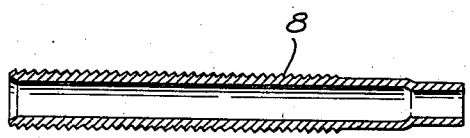
Fig. 7 is a longitudinal central section of the threaded sleeve of Fig. 2.

The rod 3 is provided, at its outer end, with a handle 7, said handle being preferably T-shaped, as shown in Figs. 1, 2 and 6 herein, the rod being preferably integrally secured therewith. At 8, I show a controller casing which, as best illustrated in Fig. 7, is preferably externally threaded throughout its greater extent, the threaded portion being adapted to be disposed through the instrument panel 9, a lock washer 10 and a nut 11 being disposed on the inner face of said instrument panel and adapted to retain the threaded portion 8 in telescoped relation with said panel.

On the outer face of said instrument panel and over the outer end of said threaded portion, an internally threaded sleeve 12 is threaded, a collet 13 being adapted to be screw threaded within the most forwardly disposed portion of the sleeve 12, said collet comprising a preferably square bore 14 and being externally threaded, as best shown in Fig. 4, and provided with a plurality of longitudinal slits 15, preferably four in number as shown in Fig. 5, whereby when the collet is disposed within the sleeve and threadingly engaged therewith, the tongues 16—16, which are resilient by virtue of the collet being formed of spring brass or bronze or like material, are adapted to be compressed, the tongues tightly abuttting the outer terminus of the threaded portion 8 and being jammed inwardly thereof causing the same to make tight frictional engagement with the rod 3.

Referring to Fig. 6, the solid line position of the handle indicates the position of the same when the collet is in retracted non-locking position, in which position the tongues 16 of the collet are not wedgingly engaged within the threaded portion 8. When the parts are in this position, the Bowden wire may be reciprocated longitudinally at will to move the controlled device, not shown, to any desired adjusted position.

When the operator has reciprocated the wire to the given desired position such as shown in Figs. 1 and 2, the parts can be locked by turning the handle to the dotted line position shown in Fig. 6, the handle being rotated a slight amount in a clockwise direction whereby the collet is threadingly moved within the sleeve 12, the tongues being forced into locking engagement with the sleeve 8.

It is to be noted that when the parts are locked as described, the Bowden wire, which is capable of being swivably moved in any desired rotative direction relative to the control device, is locked against reciprocatory movement.

It is further to be noted that the collet 13 is provided with a tapered end portion 17 which tapered end portion is made up by the inwardly disposed tongues 16 and that said taper increases the wedging relation between the sleeve 8 and the collet.

To assemble the improved Bowden control of my invention, it is to be noted that only one hole is provided in the dash for the assembly of the control device therewith.

Although I have described my invention in connection with a specific embodiment thereof, it is to be noted that numerous and extensive departures may be made therefrom without, however, departing from the spirit of my invention and the scope of the appended claim.

I claim:

In a control device adapted to be mounted in a panel, the combination of an externally threaded sleeve adapted to project through said panel, an internally threaded sleeve adapted to be threadingly engaged with said first named sleeve element and adapted to cooperate with means on the externally threaded sleeve to clamp said device to the panel, an externally threaded collet having tapered tongues associated therewith, a control rod adapted to be disposed longitudinally within said collet and said tubular sleeve elements, manually operable means adapted to be disposed at one end of said control device whereby upon rotative movement thereof said collet is adapted to be lockingly engaged with said sleeve elements and said control rod, said tongues being disposed in wedging relation with said first named sleeve element and control rod to restrain longitudinal movement of the control wire with respect to said sleeve elements.

OLIVER P. CROUSE.